UNITED STATES PATENT OFFICE.

WILHELM BERCHELMANN, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

DYE.

1,014,204. Specification of Letters Patent. Patented Jan. 9, 1912.

No Drawing. Application filed December 7, 1910. Serial No. 596,125.

*To all whom it may concern:*

Be it known that I, WILHELM BERCHELMANN, doctor of philosophy, chemist, citizen of the German Empire, residing at Vohwinkel, near Elberfeld, Germany, have invented new and useful Improvements in New Dye, of which the following is a specification.

My invention relates to the manufacture and production of new compounds of the anthracene series. The process for their production consists in treating alpha-aminoanthraquinones with alkylene oxids, especially ethylene oxid:

glycid:

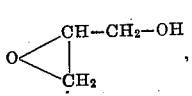

propylene oxid:

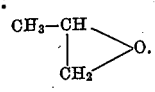

These new compounds contain in their molecule the characteristic group

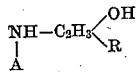

in which R stands for a substituting group, A for the anthraquinone nucleus.

If instead of monoaminoanthraquinones diaminoanthraquinones are employed in the process, the free valency in the above group is replaced by another group

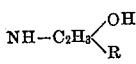

so that diaminoanthraquinone derivatives contain in their molecule the characteristic group:

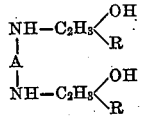

By treating the new compounds thus produced with sulfonating agents soluble new dyestuffs are obtained. It is not necessary to introduce sulfonic groups into the products obtained by the action of alkylene oxids if the starting materials contain already sulfonic groups.

The new dyes are after being dried and pulverized in the shape of their alkaline salts dark powders which are soluble in water generally with from a red to blue color and which are soluble in concentrated sulfuric acid generally with from a red to violet-red color. They dye wool generally from red to blue to violet shades.

In order to illustrate the new process more fully the following example is given, the parts being by weight:—A mixture of 25 parts of 1.4-diaminoanthraquinone, 50 parts of glacial acetic acid, 50 parts of ethylene oxid and 250 parts of nitrobenzene is heated for several days to 30–35° C. until it has assumed a blue coloration.

The new product thus obtained is filtered off and dried, and has probably the following constitution:

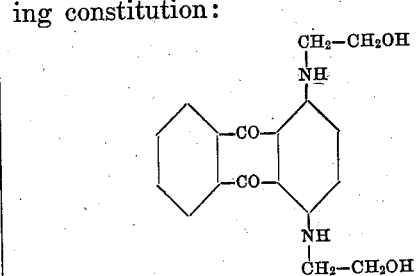

10 parts of it are then introduced into 100 parts of fuming sulfuric acid (5 per cent. $SO_3$) and the mixture is stirred at 15–20° C. until a sample is completely soluble in water. It is then poured into 600 parts of ice water, the dye is salted out with common salt and dried. It is a dark powder which is soluble in water with pure blue color and which is soluble in concentrated sulfuric acid with a violet-red color. It dyes wool pure blue shades fast to light and has probably the following constitution:

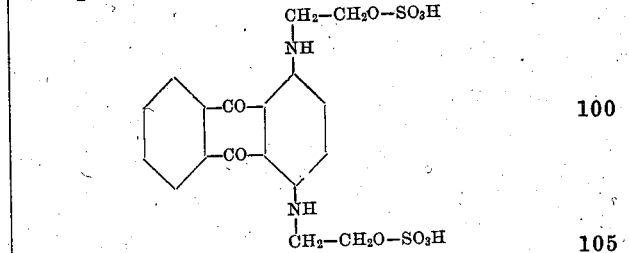

The process is carried out in an analogous manner as described in the example on starting from other alpha-aminoanthraquinones, e. g. 1.5-diaminoanthraquinone, 1-amino-anthraquinone, 1.4-amino-oxy-anthraquinone, para-diamino-anthrarufine disulfonic acid, etc.

Other sulfonating agents, e. g. chlorosulfonic acid, etc., may be used.

I claim:—

1. The herein described new dyestuffs obtainable from 1-aminoanthraquinones and alkylene oxids containing in their molecule the characteristic group

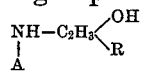

in which R stands for a substituting group and A for the anthraquinone nucleus which are after being dried and pulverized in the shape of their alkaline salts dark powders soluble in water generally with from a red to blue color, soluble in concentrated sulfuric acid generally with from a red to violet-red color; and dyeing wool generally from red to blue to violet shades, substantially as described.

2. The herein described new dyestuff obtainable from 1.4-diaminoanthraquinone and ethylene oxid, having probably the following constitution:

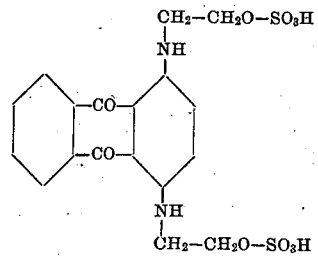

which dye is after being dried and pulverized in the shape of its sodium salt a dark powder soluble in water with a pure blue color and soluble in concentrated sulfuric acid with a violet-red color; dyeing wool pure blue shades fast to light, substantially as described.

In testimony whereof I have hereunto set my hand in the presence of two subscribing witnesses.

WILHELM BERCHELMANN. [L. S.]

Witnesses:
CHAS. J. WRIGHT,
ALFRED HENKEL.